United States Patent [19]

Bramson

[11] Patent Number: 5,422,713
[45] Date of Patent: Jun. 6, 1995

[54] BI-REFRINGENT WAVEGUIDE ROTATIONAL ALIGNMENT METHOD USING WHITE LIGHT INTERFEROMETY

[75] Inventor: Michael D. Bramson, Ridgecrest, Calif.

[73] Assignee: The United states of America as represented by the Secretary of the Navy, Washington, D.C.

[21] Appl. No.: 210,864

[22] Filed: Mar. 21, 1994

[51] Int. Cl.⁶ ............ G01N 21/23; G01N 21/88
[52] U.S. Cl. .................................. 356/73.1
[58] Field of Search ........................ 356/73.1

[56] References Cited

U.S. PATENT DOCUMENTS 5,245,400 9/1993 Anjan et al. ............... 356/73.1

*Primary Examiner*—Vincent P. McGraw
*Attorney, Agent, or Firm*—Melyin J. Sliwka; John L. Forrest, Jr.

[57] ABSTRACT

A method for rotationally aligning two bi-refringent waveguides, a single bi-refringent waveguide and a polarizing fiber or Ti-indifused fiber, and a bi-refringent waveguide and a proton exchange integrated optical chip. The method employs a scanning Michelson interferometer, an ELED light source and an appropriate arrangement of an input polarizer, and output analyzer, necessary coupling lens and a display means for visually observing coherence characteristics of the waveguides during alignment. An Advantest analyzer which contains a scanning Michelson interferometer and display means is used in a preferred embodiment optical arrangement. A set of mathematic relationships applicable to the alignments addressed by the invention is provided. Alignment accuracy as low as $\delta \cong 0.18°$ is possible.

6 Claims, 4 Drawing Sheets

BI-REFRINGENT WAVEGUIDE ROTATIONAL ALIGNMENT METHOD USING WHITE LIGHT INTERFEROMETY

BACKGROUND OF THE INVENTION

1. Field of the Invention

The present invention is method for aligning bi-refringent waveguides and more particularly a method for using an interferometer sensitive to rotational misalignments between bi-refringent waveguides to make precise rotational alignments of such waveguides.

2. Description of the Prior Art

Bi-refringent waveguides are used extensively for interferometer applications such as the fiber optic gyroscope. Examples of bi-refringent waveguides would be polarization maintaining fiber and integrated optics circuits. The performance of the fiber optic gyro is a direct function of the rotational misalignments between the refractive index axes of the bi-refringent waveguide sections which comprise the optical circuit. It is, therefore, imperative to obtain the proper rotational alignment between the waveguide sections before the joining process is implemented.

Presently, fiber to fiber, fiber to waveguide, and fiber to chip alignments ($\theta$) or extinction characterization ($\epsilon$) are made by an intensity measurement using a polarizer-/analyzer set-up. The disadvantages of the above techniques are that under the most favorable conditions, the limit of resolution is approximately 1° or extinction measurements of $-35$ dB.

The present invention successfully addresses the above shortcoming and deficiencies as follows:

The output of the invention is a function of $\theta$ or $\epsilon$ instead of $\theta^2$ or $\epsilon^2$ as in the intensity measurement. This gives the invention its superior resolution limit.

It is thus an object of the present invention to provide a method for reliably and precisely aligning bi-refringent optical waveguides.

It is yet another object of the present invention to provide a method for aligning bi-refringent optical waveguides to an accuracy of $<0.2°$.

It is still another object of the present invention to provide a method for aligning bi-refringent optical waveguides interferometrically.

It is another object of the present invention to minimize or eliminate coherence feature introduction and adverse effect in the process of alignment of bi-refringent fibers and waveguides.

It is finally another object of the present invention to provide a method of performing extinction measurements more accurately than with intensity measurements.

SUMMARY OF THE INVENTION

The present invention is a method for using a scanning interferometer in an arrangement with a light source, an input polarizer, an output analyser, and an optical display for the output of the interferometer to permit visual observation of the effect of the rotational alignment of the optical waveguides and a set of algorithms applicable to each of the alignment applications covered within the scope of the claimed invention. The method is easily implemented and is quite accurate within a range determinable by the user, but at least down to $<0.2°$.

The above discussed objects, features, and advantages of the present invention will be more clearly understood when considered in light of the detailed discussion and accompanying drawings which follow.

DETAILED DESCRIPTION

Figure 1:
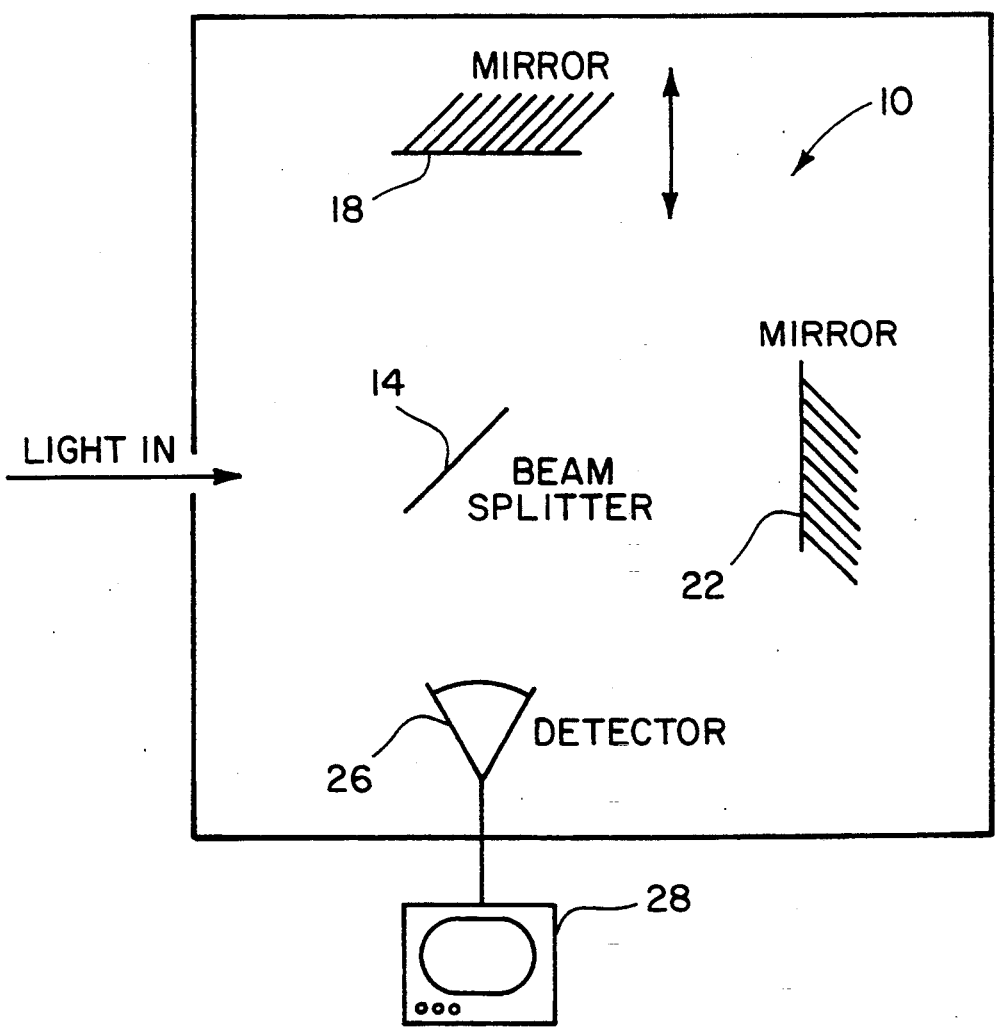
FIG. 1 is a diagrammatic layout of a scanning Michelson interferometer.

With reference to the figures and in particular FIG. 1 depicts a typical scanning Michelson interferometer 10. The interferometer 10 is shown to contain the beam splitter 14, the scanning mirror 18, the stationary mirror 22, and the detector 26. The operation of the scanning Michelson interferometer is well known in the art so discussion of operation will not be provided. The present invention contemplates the use of white light interferometry and a scanning Michelson interferometer 10 with an external visual display 28 connected to the detector 26 to permit easy observation of the effects provided by and necessary to the invention methodology. In particular, a display 28 that magnifies the output of the detector 26 is desirable. The Advantest TQ8346 Spectrum Analyzer which contains a scanning Michelson interferometer, integral display, and measurement cursors in a single package has been found quite useful in performing the method of the present invention. See FIG. 3.

Figure 2:
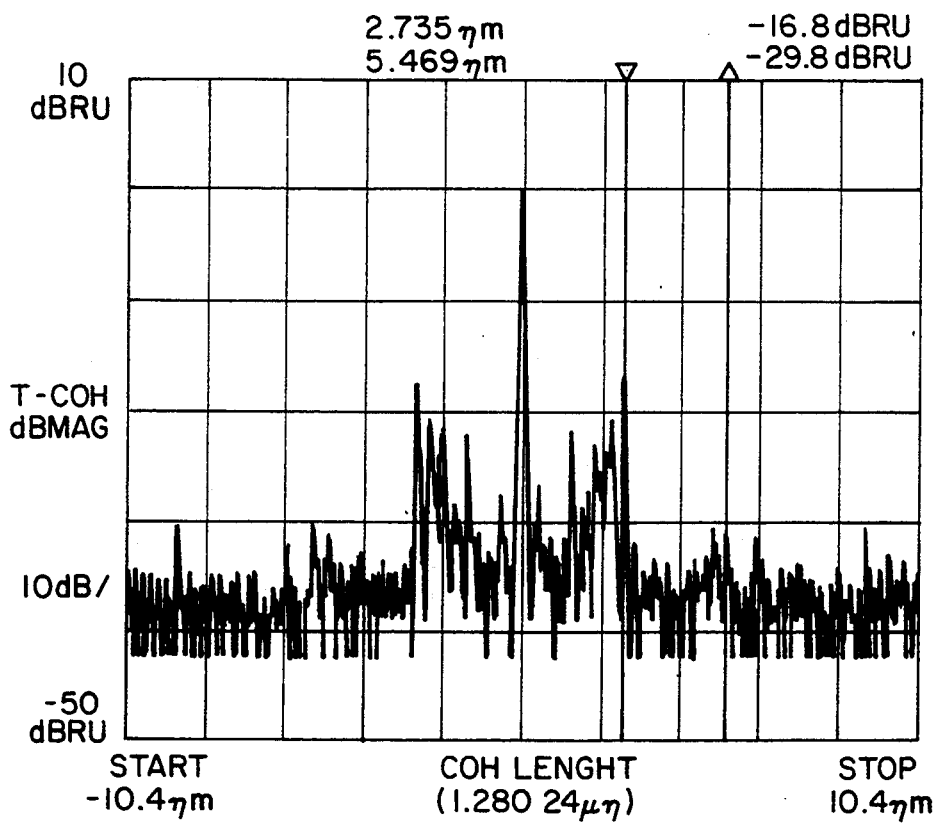
FIG. 2 is a typical self-coherence spectrum of an ELED.

In order to resolve fine coherence features when using the method of the present invention a low coherence light source must be used. The preferred optical arrangement for the invention methodology uses an Edge Light Emitting Diode (ELED), 38 in FIG. 3, since, in general, this type of device has relatively few coherence features. Multiple coherence features, aside from the main feature centered at the interferometer zero point, tend to make the display difficult to interpret when, as will be seen, waveguide related features are present. FIG. 2 shows a typical self coherence spectrum of an ELED through non-polarization sensitive elements. The predominant features on either side of the central peak are due to the cavity associated with the diode end faces. These features repeat periodically to infinity but quickly decay in amplitude and are usually indistinguishable from the noise after the second set. Each feature above the noise is then interpreted as a region of light source self coherence.

Figure 3:
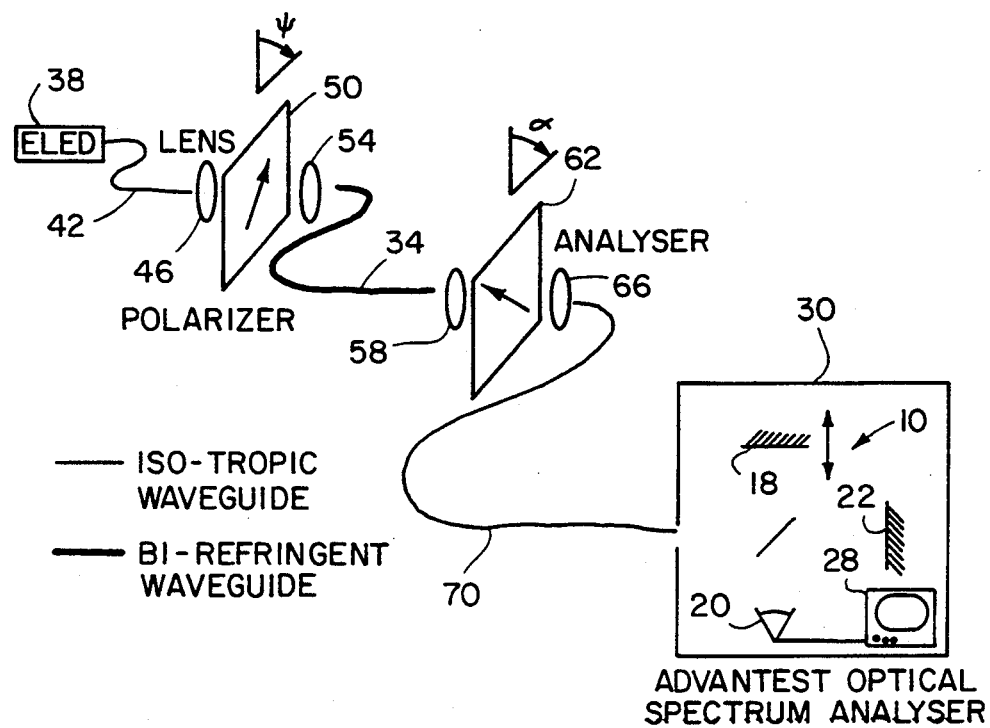
FIG. 3 is a diagrammatic arrangement of optical elements used to characterize a single segment of bi-refringent optical fiber waveguide.

For purposes of understanding the method of the present invention and the relationship of white light interferometry, a detailed description of FIG. 3 is provided, followed by an explanation of the arrangement of optical elements depicted in FIG. 3, and finally a discussion of the lenses and polarizers.

FIG. 3 depicts an arrangement of optical elements, including the Advantest Optical Spectrum Analyzer 30 used to characterize a single segment of bi-refringent optical fiber waveguide 34. The arrangement of optical elements in FIG. 3 includes the ELED light source 38, a segment of isotropic optical fiber waveguide 42 extending between the ELED 38 and the coupling lens 46, the polarizer 50 followed by the coupling lens 54, the segment of birefringent waveguide 34 followed by the coupling lens 58, the analyzer 62, lens 66, another segment of isotropic optical fiber waveguide 70, and finally the Advantest Optical Spectrum Analyzer 30, containing the interferometer 10 among other functions. FIG. 3 does not depict the exact mechanisms of the Advantest Analyzer. It is intended to depict symbolically a means for accurately measuring mirror movement and extracting the envelope of the magnitude of the signal from the photodetector 26 which is necessary to prepare the information signals for presentation by the display 28. The Advantest processor (not shown) performs these functions and supplies its outputs to the display 28. A Helium/Neon laser (not shown) is used to superimpose its light on the input signal to the Analyzer 30. A separate photo-detector picks up this light and feeds it to the processor for precision measurement of mirror movement. Other means known to those skilled in the art may be employed to perform these functions. The Advantest was successfully used in a preferred embodiment of the present invention. The optical element arrangement in FIG. 3, with the exception of the specimen bi-refringent waveguide 34 being characterized, is essentially the arrangement used for the alignment method of the present invention, as hereinafter discussed, except for making the beat length measurement described below.

Figure 4:
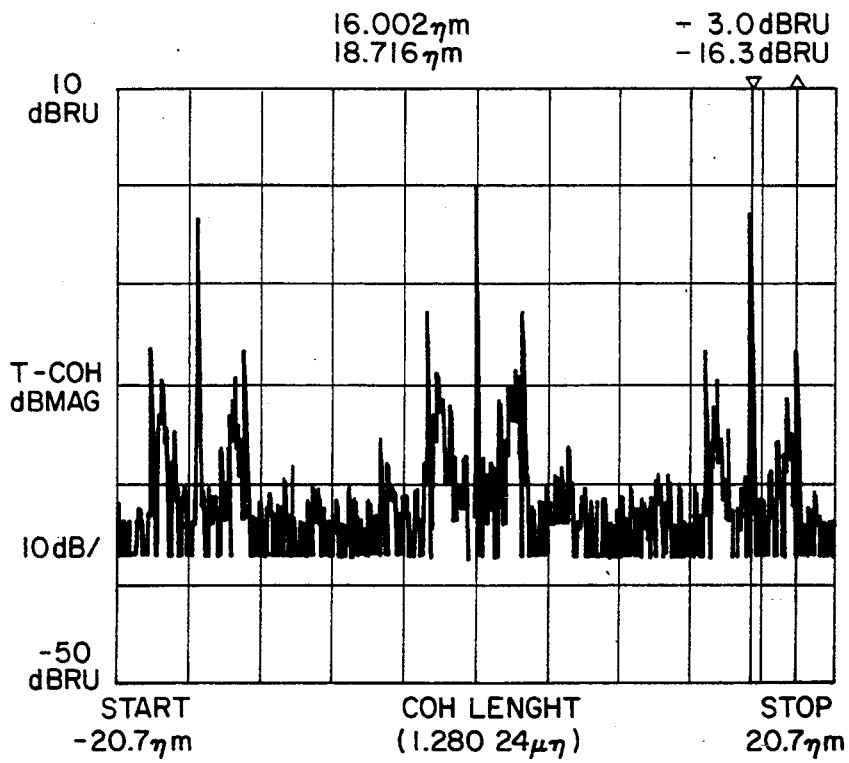
FIG. 4 is a double-sided spectrum resulting from the use of the system shown in FIG. 3.

To understand White Light Interferometry, consider the optical set-up presented in FIG. 3. The input polarizer 50 and output analyzer 62 are both aligned to be at a 45° angle with respect to the axes of the bi-refringent fiber 34. Therefore, the input polarizer 50 insures equal excitation of both axes of the fiber 34 and the output analyzer 62 ensures equal sampling of the light from both axes. The light entering the Advantest 30 then, has traveled two distinct optical paths. It is assumed that the length of bi-refringent fiber 34 is long enough so that the light in each axis becomes mutually incoherent. For purposes of the following discussion, the lower index of refraction path is referred to as the fast axis and the higher index path as the slow axis. The interferometer 10 splits the light into two beams which travel the reference arm defined by stationary mirror 22 and the moving arm defined by moving mirror 18. When the moving arm mirror 18 is at the zero position or when both arms are of equal length, the fast axis light in both arms is correlated and the slow axis light in both arms is correlated and a large central peak is observed. As the moving arm mirror 18 scans longer than the reference arm mirror 22, it retards its light relative to the light in the reference arm and providing the moving arm has enough travel, the fast axis component of the moving arm light will, at a given position, be recorrelated with the slow axis component of the reference arm light and a peak will be observed. As the moving arm mirror 18 continues to scan, the other light source features are observed. It should be noted that this recorrelation will replicate the entire optical self coherence spectrum about the new peak at half the intensity since half the light is being recorrelated, assuming input polarizer 50 and output analyzer 62 are aligned at 45° with respect to the waveguide axes. The moving arm mirror 18 actually starts from a point such that the moving arm is shorter than the reference arm and goes to a point equally greater than the reference arm thus yielding the double sided spectrum shown in FIG. 4.

It should be noted that in all of the optical arrangements herein described, the polarizer 50 and analyzer 62 extinction ratio should be >42 dB. Also, strain free lenses should be used to couple light in and out of the various fibers. Failure to use components with these characteristics will result in unwanted polarization mixing, in the case of the lenses, or insufficient extinction ratio, in the case of the polarizer and analyzer, resulting in degraded resolution limits for the various alignments.

Preparatory Measurements

Before attempting rotational alignment or extinction measurement the light source must be characterized with respect to center wavelength and coherence, the individual waveguide feature of each of the bi-refringent waveguides to be aligned or extinction characterized should be determined, and the beat length of each waveguide, should be calculated. To accomplish the beat length calculation, the physical length of the waveguide segment in question must be known. This can be accomplished simply with a ruler.

Source Center Wavelength and Coherence Property Determination

Center wavelength of the light source can be measured using the Advantest in the wavelength spectrum mode. The wavelength and coherence spectrum are Fourier transforms of each other. The wavelength spectrum should be averaged over several sweeps. The Advantest has a center wavelength function.

Next, to determine the coherence properties of the light source using the Advantest, select the coherence function and adjust the span until all of the source coherence features are displayed. The operator can write down the location of each coherence feature by using the "x" cursor or a plot can be obtained using a suitable plotter. See FIG. 2.

Waveguide Feature Determination

For waveguide feature determination the optical arrangement is set up as in FIG. 3. The input polarizer 50 is not essential for this measurement. Its function is to provide a well defined input state of polarization so that predictable correlation peak amplitudes can be realized when rotationally aligning two bi-refringent sections of optical waveguide. For making the waveguide feature measurement, it is important only to know the position of the waveguide recorrelation peak. Since the ELED 38 is a quasi-unpolarized source, there will be sufficient light in each axis for the measurement.

The analyzer 62 is turned until a waveguide recorrelation peak is observed bobbing up and down in relation to the analyser angle with respect to the fiber axes. The analyzer angle is adjusted to maximize this peak. The entire self coherence spectrum will be replicated about the recorrelation peak, therefore, care must be taken to not to confuse a source feature with the recorrelation feature. An "x" cursor of the Advantest 30 is placed on the peak of the waveguide feature and the "x" position of the cursor is read and noted. The waveguide feature ($\omega$) is thus determined.

Beat Length Calculation

By determining the waveguide feature ($\omega$), the mirror position at which a recorrelation occurred is simultaneously measured and is identical to ($\omega$). There exists a relationship between beat length, physical length, the center wavelength of the light source, and the mirror position at which a waveguide recorrelation takes place. In the event that the physical length of the waveguide changes, a common occurrence when working with fiber optics, the new waveguide feature ($\omega$) can be calculated knowing the beat length of the waveguide and how much the physical length of the waveguide has changed. In other words, the waveguide feature ($\omega$) would not need to be experimentally redetermined.

Beat length is defined as the physical length of bi-refringent waveguide needed to accumulate 2 of phase difference between the light components propagating along each of orthogonal refractive index axes. Let:

$\Lambda$ = beat length
$\lambda$ = central free space wavelength of the light source
L = physical length of the bi-refringent waveguide
$\omega$ = spacial frequency (mirror position from interferometer zero path length difference, to a recorrelation peak)

The beat length would then be expressed as $$\Lambda = \frac{L\lambda}{\omega}$$

Rotational Alignment of Two Bi-Refringent Waveguides

Figure 5:
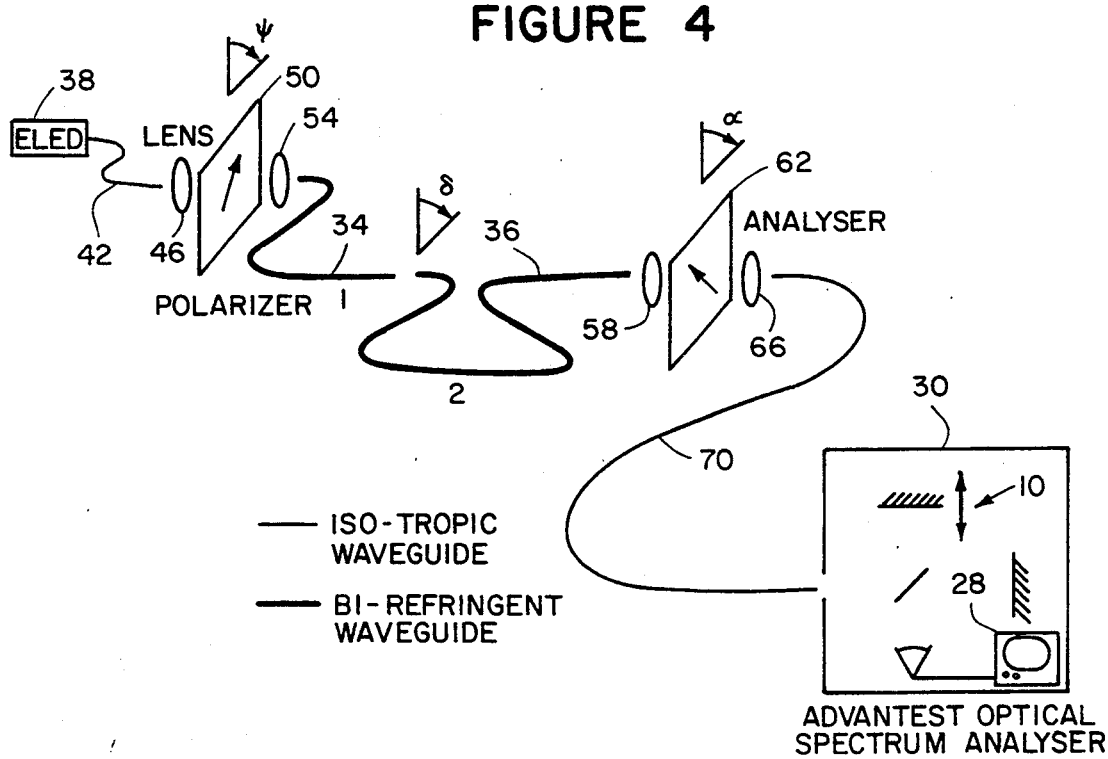
FIG. 5 is a diagrammatic layout for the invention method used to rotationally align two bi-refringent waveguides.

The rotational alignment of two bi-refringent waveguides such as two optical fibers is performed using the arrangement depicted in FIG. 5. It should be noted that this is the same optical arrangement as in FIG. 3 except that in FIG. 5, one end of a first segment of bi-refringent optical fiber 34 is shown extending from juxtaposition with coupling lens 54, and one end of a second segment of bi-refringent optical fiber 36 is shown extending from juxtaposition with the coupling lens 58, the ends of both segments opposite those juxtaposed with the two coupling lenses being juxtapositioned with each other.

The polarizer 50 angle $\Psi$ is with respect to the fast axis of fiber 34. The angle $\alpha$ is the analyzer 62 angle with respect to the fast axis of fiber 36. The angle $\delta$ is the angle between the fast axis of fiber 34 and the fast axis of fiber 36. Angles $\alpha$, $\delta$, and $\Psi$ have a positive clockwise convention. The coherence features of the waveguide segments will have normalized amplitudes as follows:

| Position | Normalized Amplitude | |
|---|---|---|
| 0 | 1 | |
| $\pm\omega_1$ | $\frac{dDPp(A^2 - a^2)}{NF}$ | |
| $\pm\omega_2$ | $\frac{dDAa(p^2 - P^2)}{NF}$ | expression set I |
| $\pm(\omega_1 + \omega_2)$ | $\frac{PpAaD^2}{NF}$ | |
| $\pm(\omega_1 - \omega_2)$ | $\frac{PpAad^2}{NF}$ | | where:
$\omega_1$ = waveguide feature of fiber 1
$\omega_2$ = waveguide feature of fiber 2
d = sin $\delta$
D = cos $\delta$
p = sin $\Psi$
P = cos $\Psi$
a = sin $\alpha$
A = cos $\alpha$
NF = Normalizing Factor and NF is given by the expression:

$$NF = A^2(D^2P^2 + d^2p^2) + a^2(d^2P^2 + D^2p^2);$$

The polarizer 50 is turned until the amplitude of the $\pm\omega_2$ features disappear into the noise level. Next the analyzer 62 is turned until the amplitude of the $\pm\omega_1$, features disappear into the noise level. Both the polarizer 50 and the analyzer 62, are by the above procedure set to 45° with respect to the axes of fiber 34 and fiber 36, respectively. The amplitudes of the remaining features are thus simplified to expression set Ia:

| Position | Normalized Amplitude | |
|---|---|---|
| $\pm(\omega_1 + \omega_2)$ | $1/2\cos^2\delta$ | Ia |
| $\pm(\omega_1 - \omega_2)$ | $1/2\sin^2\delta$ | |

If a fast/fast, slow/slow alignment is desired, one fiber is turned relative to the other until the $\pm(\omega_1-\omega_2)$ peak disappears into the noise level. Typically the noise level is 25 to 30 dB down from the main peak if the Advantest Analyzer is used, and is dependent on input power and the scaling functions of the analyzer. The noise floor will, of course, be dependent on the selection of the analyzer 30.

It is recommended that the Advantest Analyzer be used in the normalized mode in conjunction with its auto scaling function, however, the Advantest can be set up manually if the user prefers. Assuming a −25 dB noise level and the amplitude equation for $\pm(\omega_1-\omega_2)$ from expression set Ia, the resolution limit in angular alignment would be:

$$10^{-\frac{25}{10}} = \frac{1}{2}\sin^2\delta$$

or: $\delta \approx 4.56°$

If better alignment accuracy is required, either the polarizer 50 or the analyzer 62 may be turned 45° from its current position as described above. This eliminates the recorrelation effects of either fiber 34 or fiber 36 since the polarizer 50 or the analyzer 62 would be aligned along a principal axis of one or the other of the fibers 34 or 36, respectively. Assuming the polarizer is turned 45°, from expression set I, expression set Ib is generated:

| Position | Normalized Amplitude | |
|---|---|---|
| $\pm\omega_2$ | $\frac{1}{2}\sin 2\delta$ | expression Ib |

Next the fiber 36 is rotated relative to fiber 34 to minimize the $\pm\omega_2$ peaks. Assume 25 dB below the central peak is observed. The resolution limit of this measurement is now:

$$10^{-\frac{25}{10}} = \frac{1}{2}\sin 2\delta$$

-continued or: $\delta \cong 18°$

Align a Bi-Refringent Fiber to a Polarizing Waveguide

The method of the present invention may additionally be used to align a bi-refringent fiber to a ti-indiffused integrated optic chip or polarizing fiber. For example, assume that fiber 34 in FIG. 5 is replaced by a polarizing waveguide and that extinction occurs along the X axis of that waveguide. From the equation set I above expression set II is generated:

| Position | Normalized Amplitude | |
|---|---|---|
| 0 | 1 | |
| $\pm\omega_1$ | $\dfrac{\epsilon DdPp(A^2 - a^2)}{NF}$ | |
| $\pm\omega_2$ | $\dfrac{dDAa(\epsilon^2 p^2 - P^2)}{NF}$ | expression set II |
| $\pm(\omega_1 + \omega_2)$ | $\dfrac{\epsilon PpAaD^2}{NF}$ | |
| $\pm(\omega_1 - \omega_2)$ | $\dfrac{\epsilon PpAad^2}{NF}$ | | where:

$\epsilon$ = electric field extinction ratio and NF is given by:

$$NF = \epsilon^2 p^2 (d^2 A^2 = D^2 a^2) = P^2 (D^2 A^2 = d^2 a^2)$$

To accomplish the precision alignment, first turn the analyzer such that $\pm\omega_2$ disappears into the noise. Verify that $\pm(\omega_1+\omega_2)$ and $\pm(\omega_1-\omega_2)$ have also vanished into the noise and that $\pm\omega_1$ is still present. This will orient the analyzer to either the 0° or the 90° position. The analyzer needs to be at the 45° position, therefore turn the analyzer 45° from its current position and verity that $\pm\omega_1$ has disappeared into the noise and the $\pm\omega_2$, $\pm(\omega_1+\omega_2), \pm(\omega_1-\omega_2)$ are now present. Next turn the polzrizer until $\pm(\omega_1+\omega_2)$ and $\pm(\omega_1-\omega_2)$ disappear into the noise level and verify that $\pm\omega_2$ is still present. If $\pm\omega_2$ is not present, turn the polarizer 90° from its current position. This part of the procedure aligns the polarizer to the desired 0° position. The only feature on the display at this point should be the $\pm\omega_2$ feature which will be used for the precision alignment. At this point, the procedure for aligning a bi-refringent fiber to a polarizing waveguide is the same as the procedure for precision aligning two bi-refringent fibers and is governed by the same equation and can be achieved to the same accuracy for all intents and purposes. The polarizing fiber and Ti chip waveguides have an $\epsilon$ coefficient $\cong -17$ dB. With this level of extinction, the sum and difference (last two) terms in expression set IIa will likely be visible on the display although they will be attenuated compared to the case of two bi-refringent fibers.

Determine Epsilon

Epsilon, ($\epsilon$), can be determined after aligning of the waveguides to either $\delta=0°$ or $\delta=90°$ by using either term $\pm(\omega_1+\omega_2)$ or $\pm(\omega_1-\omega_2)$ respectively in expression set II and measuring the amplitude of the appropriate recorrelation peak. The polarizer must be in the 45° position before the peak measurement for determining $\epsilon$ is made; therefore, turn the polarizer now 45° from its current position. To calculate $\epsilon$:

$$\epsilon = \frac{1}{2X}[1 - \sqrt{1 - 4x^2}]$$

where $x = 10^{measurement\ in\ dB\ of\ the\ recorrelation\ peak/10}$ where the amplitude of the recorrelation peak is expressed as so many dB down (−dB) from the central peak.

Rotational Alignment of Bi-Refringent Waveguide to a Proton Exchange Integrated Optics Chip In the event that the polarizing waveguide is a proton exchange integrated optic chip, $\epsilon$ would be less than −30 dB and the likelihood of observing the terms $\pm(\omega_1+\omega_2)$ and $\pm(\omega_1-\omega_2)$ of expression set II would be practically non-existent. In this case, the following procedure is used.

The bi-refringent fiber is mounted in a carrier, typically a silicon block with a v-groove, to accommodate the fiber. The fiber 36 is illuminated with back-light or side-light with a common microscope light source or equivalent to reveal the core and stress member structure of the fiber if the cleaved fiber end is viewed under a microscope. Before gluing the fiber 36 in place in the v-groove, a careful attempt should be made to align the imaginary line which passes through the stress members and the core to be either parallel or perpendicular to one of the sides of the carrier. This imaginary line will likely be the slow axis of the fiber 36, however, different manufacturers have different ways of inducing bi-refringence and if knowing which axis is slow and fast is important, the manufacturer should be consulted.

Figure 6:
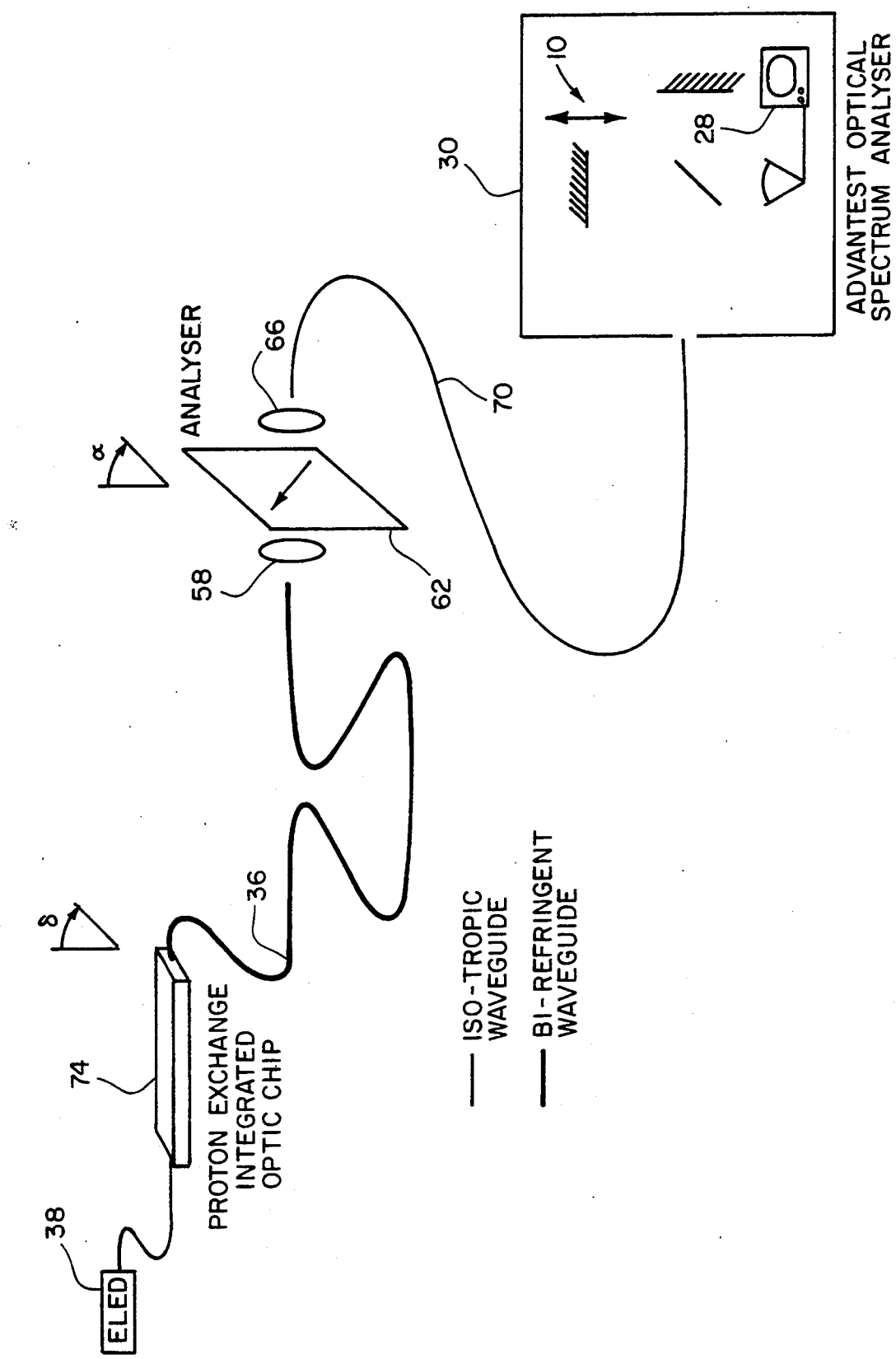
FIG. 6 is a diagrammatic arrangement of optical elements required for the invention methodology applied to the alignment of a bi-regringent fiber to a polarizing integrated optic chip.

The optical setup is arranged as shown in FIG. 6. Note, the integrated optic chip 74 acts as the polarizer. Situate the bi-refringent fiber 36 such that the axis of choice is approximately (by eye) at a 45° angle to the propagating axis of the chip. The analyzer 62 is turned until the peak due to the length of bi-refringent fiber 36 disappears into the noise level of the display or, if this is not possible, then until it is at a minimum. This analyzer setting is along one of the fiber axes. Since a 45° alignment is desired, turn the analyzer 45° from its current position.

Expression set II thus becomes:

| Position | Normalized Amplitude | |
|---|---|---|
| 0 | 1 | expression set IIa |
| $\pm\omega_2$ | $\cong \frac{1}{2}\sin 2\delta$ | | a very good approximation if $\epsilon$ in expression set II is $<0.001$.

According to expression set IIa, the fiber 36 is rotated relative to the chip 74 until the $\pm\omega_2$ peaks are minimized. This will insure that either the fast or slow axis of the fiber is aligned to the propagating axis of the chip 74. The resolution limit of this procedure is identical to the precision alignment described in the procedure for aligning two bi-refringent fibers, i.e. $\delta \cong 0.18°$.

It is thought that the present invention and many of its attendant advantages will be understood from the foregoing description and it will be apparent that various changes may be made in the method and arrangement of the optical test components thereof without departing from the spirit and scope of the invention or sacrificing all of its material advantages, the optical arrangements and method steps described being merely exemplary embodiments thereof.

What is claimed:

1. The method of rotationally aligning first and second bi-refringent optical waveguide segments comprising the steps of:
   a. selecting a low-coherence light source;
   b. measuring the self-coherence spectrum of said light source to identify features due solely to said source;
   c. characterizing each waveguide segment as to its recorrelation peak and measuring the recorrelation distance for each such that said segments have normalized waveguide features having "Positions" and "Normalized Amplitudes" defined by:

| Position | Normalized Amplitude | |
   |---|---|---|
   | 0 | 1 | |
   | $\pm \omega_1$ | $\dfrac{dDPp(A^2 - a^2)}{NF}$ | |
   | $\pm \omega_2$ | $\dfrac{dDAa(p^2 - P^2)}{NF}$ | expression set I |
   | $\pm(\omega_1 + \omega_2)$ | $\dfrac{PpAaD^2}{NF}$ | |
   | $\pm(\omega_1 - \omega_2)$ | $\dfrac{PpAad^2}{NF}$ | | where:
   $\omega_1$ = recorrelation distance of fiber 1
   $\omega_2$ = recorrelation distance of fiber 2
   $d = \sin \delta$
   $D = \cos \delta$
   $p = \sin \Psi$
   $P = \cos \Psi$
   $a = \sin \alpha$
   $A = \cos \alpha$
   NF = Normalizing Factor and NF is given by the expression:

$$NF = A^2(D^2P^2 + d^2p^2) + a^2(d^2P^2 + D^2p^2);$$

d. arranging said light source to feed light via an isotropic waveguide through an input optical polarizer positioned at an angle $\Psi$ to the fast axis of said first optical fiber segment, thence through another coupling lens into one end of said first optical fiber segment, the opposite end of said first segment juxtapositioned with one end of said second optical fiber segment, the two juxtapositioned ends being disposed relative to each other such that the angle between the fast axis of the first segment and the fast axis of the second segment is $\delta$, the opposite end of said second segment positioned relative to a coupling lens for focusing light from said second segment through an optical analyzer positioned at an angle $\alpha$ with respect to the fast axis said second segment, the angles $\Psi$, $\delta$, and $\alpha$ all having a positive clockwise convention, the light from said analyzer to a coupling lens for focusing into an isotropic waveguide and thence into a scanning Michelson interferometer having a visually observable output display;
   e. turning said polarizer so that it is at 45° with respect to the fast axis of said first waveguide segment at which point the amplitude of the $\pm \omega_2$, features disappear into the noise level in the image at said display;
   f. turning said analyzer so that it is at 45° with respect to the fast axis of said second waveguide segment, at which point the amplitude of the $\pm \omega_1$, features disappear into the noise level in the image at said display; and
   g. turning said first and second optical fiber segments relative to one another until the $\pm(\omega_1 - \omega_2)$ peak disappears into the noise level observed at said display.

2. The method of claim 1 further comprising the steps of:
   a. turning either the polarizer or the analyzer 45° from its position after performing step (g) in claim 1; and
   b. rotating either the first optical waveguide segment or the second optical waveguide segment to minimize the $\pm \omega_2$ peaks below the central peak observable at said display.

3. The method of claim 1 wherein said light source is an ELED.

4. The method of claim 1 wherein a polarizing optical waveguide having extinction along its x axis and an $\epsilon$ coefficient $\cong -17db$ is substituted for one of said segments and wherein expression set I becomes:

| Position | Normalized Amplitude | |
   |---|---|---|
   | 0 | 1 | |
   | $\pm \omega_1$ | $\dfrac{\epsilon DdPp(A^2 - a^2)}{NF}$ | |
   | $\pm \omega_2$ | $\dfrac{dDAa(\epsilon^2 p^2 - P^2)}{NF}$ | expression set II |
   | $\pm(\omega_1 + \omega_2)$ | $\dfrac{\epsilon PpAaD^2}{NF}$ | |
   | $\pm(\omega_1 - \omega_2)$ | $\dfrac{\epsilon PpAad^2}{NF}$ | | where:
   $\epsilon$ = electric field extinction ratio and NF is given by:

$$NF = \Box^2 p^2(d^2A^2 + D^2a^2) + P^2(D^2A^2 + d^2a^2).$$

5. The method of claim 4 wherein said polarizing waveguides are selected from the group consisting of a polarizing optical fiber, and a Ti-indiffused integrated optic chip.

6. The method of claim 4 wherein one of said polarizing waveguides is a bi-refringent fiber and the other is a proton exchange integrated optic chip further comprising the steps of:
   a. characterizing the core and stress member structure of the bi-refringent fiber;
   b. aligning the imaginary line which passes through the stress members and the core to be either parallel or perpendicular to one of the sides of a carrier having a v-groove to accommodate the fiber;
   c. gluing the fiber in the groove of the carrier;
   d. substituting the integrated optic chip for the polarizer;
   e. positioning the bi-refringent fiber such that the slow axis is visually at a 45° angle to propagating axis of the chip;
   f. turning the analyzer until the peak due to the length of bi-refringent fiber disappears into the noise level on the display, or at the very least until it is at a minimum;

g. turning the analyzer 45° from its position set in previous step so that expression set IIa becomes

| Position | Normalized Amplitude | |
| --- | --- | --- |
| 0 | 1 | } expression set IIa |
| $\pm \omega_2$ | $\approx \frac{1}{2} \sin 2\delta$ | | for $\epsilon$ in expression set IIa of $<0.001$; and h. rotating the fiber relative to the chip until the $\pm \omega_2$ peaks are minimized to insure that either the fast or slow axis of the fiber is aligned to the propagating axis of the chip.

* * * * *